United States Patent
Brzezinski et al.

(10) Patent No.: US 9,956,985 B2
(45) Date of Patent: May 1, 2018

(54) STEERING SHAFT ASSEMBLY

(71) Applicant: STEERING SOLUTIONS IP HOLDING CORPORATION, Saginaw, MI (US)

(72) Inventors: Gregory D. Brzezinski, Freeland, MI (US); Terry E. Burkhard, Bay City, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days. days.

(21) Appl. No.: 15/434,839

(22) Filed: Feb. 16, 2017

(65) Prior Publication Data
US 2017/0232995 A1    Aug. 17, 2017

Related U.S. Application Data

(60) Provisional application No. 62/295,763, filed on Feb. 16, 2016.

(51) Int. Cl.
*B62D 1/185* (2006.01)
*F16D 3/06* (2006.01)
*F16C 3/03* (2006.01)

(52) U.S. Cl.
CPC ............... *B62D 1/185* (2013.01); *F16C 3/03* (2013.01); *F16D 3/06* (2013.01)

(58) Field of Classification Search
CPC .. B62D 5/0409; B62D 5/0481; B62D 5/0463; B62D 1/16; B62D 3/12; B62D 1/185; F16D 3/06; F16C 3/03; F16H 57/0025
See application file for complete search history.

(56) References Cited

U.S. PATENT DOCUMENTS

| | | | | |
|---|---|---|---|---|
| 2,453,949 | A  * | 11/1948 | Ulinski | B62D 5/0403 180/444 |
| 4,981,049 | A  * | 1/1991 | Venable | B62D 1/184 384/272 |
| 6,095,690 | A  * | 8/2000 | Niegel | F16C 17/10 384/288 |
| 6,739,238 | B2 * | 5/2004 | Ushijima | F02F 1/20 92/158 |
| 7,048,972 | B2 * | 5/2006 | Kitahata | B05D 1/06 427/295 |
| 7,595,095 | B2 * | 9/2009 | Kitahata | B05D 1/04 427/475 |

(Continued)

*Primary Examiner* — Paul N Dickson
*Assistant Examiner* — Timothy Wilhelm
(74) *Attorney, Agent, or Firm* — Cantor Colburn LLP

(57) ABSTRACT

A steering shaft assembly is disclosed with an outer shaft operatively connected to a one of a steered member or a steering control. The outer shaft has an open end and a receiving chamber associated with the open end. The steering shaft assembly also includes an inner shaft operatively connected to another of the steered member or the steering control. The inner shaft has an engaging portion axially slideably received in the outer shaft receiving chamber. The inner shaft engaging portion also includes a polymer coating disposed on an outer surface of the inner shaft engaging portion. The coating has an outer surface that slideably engages with a surface of the outer shaft receiving chamber, and which has comprises projections and recesses along the coating outer surface.

19 Claims, 2 Drawing Sheets

(56) References Cited

U.S. PATENT DOCUMENTS

| | | | | |
|---|---|---|---|---|
| 8,123,413 B2* | 2/2012 | Tambe | ............... | F16C 33/6651 |
| | | | | 384/565 |
| 8,262,484 B2* | 9/2012 | Nakatani | .................. | B62D 1/16 |
| | | | | 464/16 |
| 8,337,315 B2* | 12/2012 | Ando | ..................... | F16D 1/101 |
| | | | | 464/16 |
| 8,382,159 B2* | 2/2013 | Tanaka | .................... | B62D 1/16 |
| | | | | 280/779 |
| 8,419,555 B2* | 4/2013 | Tokioka | ................ | B62D 1/185 |
| | | | | 29/434 |
| 8,753,215 B2* | 6/2014 | Tokioka | .................. | F16C 3/035 |
| | | | | 464/162 |
| 9,005,038 B2* | 4/2015 | Nabeshima | ............ | B62D 1/185 |
| | | | | 403/359.6 |
| 9,010,215 B2* | 4/2015 | Rietzler | ............... | B29C 59/043 |
| | | | | 184/5 |
| 9,217,196 B2* | 12/2015 | Ando | ..................... | C23C 16/26 |
| 9,446,782 B2* | 9/2016 | Kurokawa | ............... | F16D 3/06 |
| 9,566,998 B2* | 2/2017 | Kurokawa | ............... | B62D 1/16 |
| 9,618,052 B2* | 4/2017 | Miyake | ................... | F16D 1/101 |
| 9,658,132 B2* | 5/2017 | Gallimore | ............. | G01M 13/04 |
| 9,707,910 B2* | 7/2017 | Kakita | ................. | B60R 16/027 |
| 2006/0181069 A1* | 8/2006 | Yamada | ................. | B62D 1/185 |
| | | | | 280/775 |
| 2012/0080258 A1* | 4/2012 | Tokioka | .................. | B62D 1/20 |
| | | | | 180/444 |
| 2016/0102185 A1* | 4/2016 | Topolkaraev | ............ | C08J 3/203 |
| | | | | 521/134 |
| 2016/0121523 A1* | 5/2016 | Topolkaraev | ............ | C08L 23/12 |
| | | | | 264/50 |
| 2016/0153500 A1* | 6/2016 | Miyake | ................... | B62D 1/16 |
| | | | | 464/162 |
| 2016/0257850 A1* | 9/2016 | Nishida | .................... | C09D 5/03 |

* cited by examiner

STEERING SHAFT ASSEMBLY

CROSS-REFERENCE TO RELATED APPLICATION

This patent application claims priority to U.S. Provisional Patent Application Ser. No. 62/295,763, filed Feb. 16, 2016, which is incorporated herein by reference in its entirety.

BACKGROUND OF THE INVENTION

The invention relates to steering shaft assemblies and, more particularly to a telescopically adjustable steering shaft assembly for a vehicle.

Vehicles are commonly provided with a steering column assembly in which the upper portion, which carries the steering wheel, is arranged for axial adjustment to enable selective telescopic positioning of the steering wheel through a limited range. This arrangement has been found to be exceptionally advantageous in accommodating vehicle operators of varying stature. The telescoping feature can also be utilized to allow collapse of the steering column in the event of a crash.

Telescoping steering shafts can employ multi-tooth splines to rotationally link the inner and outer shafts while providing for telescoping movement in the axial direction. In some configurations, a tubular female sleeve surrounds a splined shaft with a plastic over-molded feature between the inner and outer shafts. Although such over-mold configurations can be reliable and effective, they can be expensive to produce and require a high degree of manufacturing complexity. Additionally, acceptable telescoping loads can be difficult to achieve and maintain.

SUMMARY OF THE INVENTION

In some embodiments of the invention, a steering shaft assembly comprises an outer shaft operatively connected to a one of a steered member or a steering control. The outer shaft comprises an open end and a receiving chamber associated with the open end. The steering shaft assembly also comprises an inner shaft operatively connected to another of the steered member or the steering control. The inner shaft comprising an engaging portion axially slideably received in the outer shaft receiving chamber. The inner shaft engaging portion comprises a polymer coating disposed on an outer surface of the inner shaft engaging portion. The coating comprising an outer surface that slideably engages with a surface of the outer shaft receiving chamber and comprises projections and recesses along said coating outer surface.

In some embodiments of the invention, a method of assembling the above-described steering shaft assembly comprises disposing a lubricant along the engaging portion of the coating outer surface or along a surface of the receiving chamber or along the engaging portion of the coating outer surface and a surface of the receiving chamber. The engaging portion of the inner shaft is inserted into the receiving chamber of the outer shaft to engage the projections of the coating outer surface with the receiving chamber surface and dispose the lubricant into the recesses of the coating outer surface.

In some embodiments of the invention, a method of assembling the above-described steering shaft assembly comprises inserting the engaging portion of the inner shaft into the receiving chamber of the outer shaft. A press fit tolerance is provided between the coating outer surface and the receiving chamber surface by radially-inward compression deformation of the coating outer surface projections. In some embodiments, the radially-inward compression deformation of the coating outer surface projections is accommodated by spaces between the coating outer surface recesses and the receiving chamber surface.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
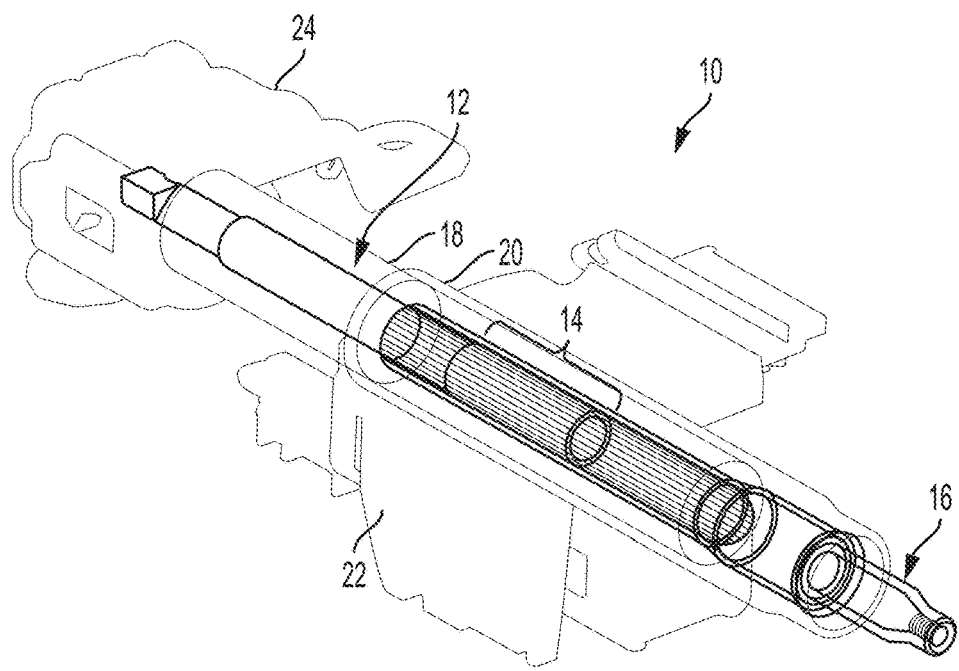
FIG. 1 is a schematic depiction of a perspective view of a steering shaft assembly.

Referring now to FIG. 1, a steering shaft assembly 10 is schematically depicted. As shown in FIG. 1, an inner shaft 12 comprises an engaging portion 14 axially slideably received in a receiving chamber of an outer shaft 16. As used herein, the term "axis" refer to an axis of rotation of the steering shaft, and the term "axially" refers to a direction parallel to the axis of rotation, extending along the length of the inner and outer shafts 12, 16. In some embodiments, the steering shaft assembly is integrated with other components into a steering assembly. An example embodiment of a steering assembly with other components is shown in FIG. 1, with the steering inner shaft 12 connected to a lower mounting assembly for operative connection to an intermediate shaft (not shown) that is connected to a steering mechanism such as a rack and pinion steering assembly (not shown) that is part of a steered member. Outer shaft 16 is operatively connected to a steering control such as a steering wheel (not shown). As further shown in FIG. 1, rotatable inner and outer shafts 12, 16 are disposed within non-rotating inner jacket 18 and outer jacket 20, which are themselves axially slideably engaged in the region of clamping assembly 22. Clamping assembly 22 can be configured to provide a friction clamping mechanism that alternatively allows or prevents operator-initiated axial sliding movement of the inner and outer jackets 18, 20 (and the inner and outer shafts 12, 16) with respect to each other.

Figure 2:
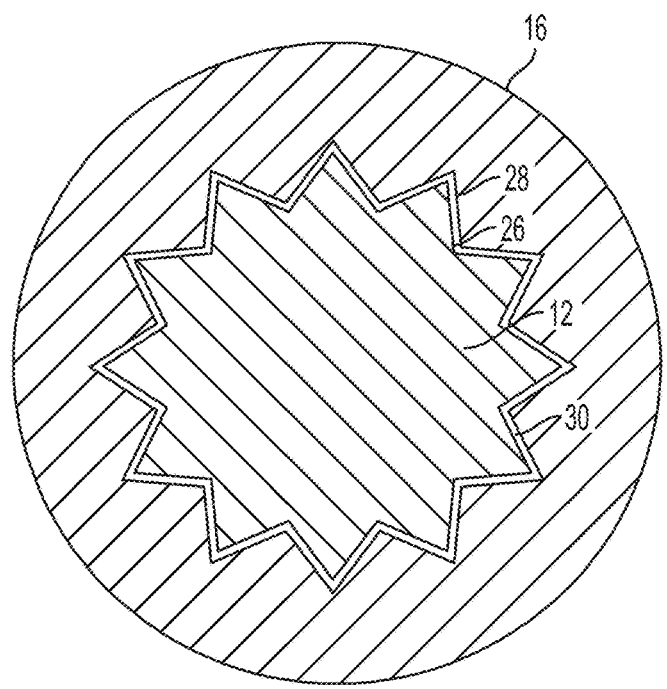
FIG. 2 is a schematic depiction of a cross-sectional view of the steering shaft assembly in engagement area between the upper and lower shafts.

Engagement between inner shaft 12 and the outer shaft 16 is depicted in greater detail in FIG. 2, which is a schematic depiction of a cross-sectional view of the inner and outer shafts 12, 16 in the region of the engagement portion 14. In some embodiments, the inner shaft 12 comprises an outer surface 26 configures with a plurality of male spline teeth extending axially along the shaft outer surface, as shown in FIG. 2. The male spline teeth are engaged with corresponding female splines on the outer shaft receiving chamber surface 28. Engagement of the male and female splines on the surfaces 26, 28 of the inner and outer shafts 12, 16 provides for torsional stiffness along the steering shaft assembly 10 for transmission of torque from the steering control to the steering member.

As further shown in FIG. 2, a polymer coating 30 is disposed on the outer surface 26 of the inner shaft 12 and is in axially slideable contact with the outer shaft receiving chamber surface 28. The polymer coating can be formed from any of a number of polymers. The polymer for the coating can be chosen from any of a number of known polymer resins, including but not limited to polyurethanes, polyesters, epoxy resin coatings, polyacrylates, polyamides (e.g., nylon), polyphenylene sulfide, polyarylether ketones (e.g., polyether ether ketone, i.e., PEEK), poly(p-phenylene), polyphenylene oxide, polyethylene (including crosslinked polyethylene, i.e., PEX), polypropylene, polytetrafluoroethylene, as well as blends and copolymers of any of the above. The coatings can optionally include curing agents that are reactive with functional groups (e.g., active hydrogen groups such as hydroxyl groups or amino groups) on the polymer. Various coating aids and additives, including but not limited to surfactants, flow control agents, antioxidants, stabilizers, etc., can also be optionally included in the coating composition.

The coating can be applied in various forms, including but not limited to a powder, powder slurry, in an aqueous solvent or organic solvent, or as a thermoplastic heated to a fluid state. Powder coatings can be applied by spray application (e.g., electrostatic spray), fluidized bed application, or electrostatic magnetic brush. The powder particles can be initially adhered to the substrate by heating the substrate or by electrostatic attraction. Liquid coating compositions such as powder slurries, aqueous or organic solvent-borne coatings, or fluid thermoplastics can be applied by spray application (e.g., electrostatic spray) or other liquid coating application techniques such as dip coating, roll coating, blade coating, nozzle coating, ink-jet coating, brush coating, sponge coating, etc.

Any of the above types of coatings can be used to provide can be utilized to provide coatings having a target thickness, a varying thickness, or a coating surface comprising projections and recesses. Powder coatings, for example, can be readily adapted to build up thickness during the powder application process, or to provide varying thickness or a surface with recesses and projections. After application of a powder coating, heat is applied to fuse the powder coating, and optionally provide some degree of flow and leveling, while leaving some thickness variation to provide the target recesses and projections at the coating surface.

Powder coating particle sizes can vary widely, for example from a minimum particle size of 1 μm, more specifically 5 μm, more specifically 10 μm, more specifically 25 μm, and even more specifically 50 μm, to a maximum particle size of 250 μm, more specifically 150 μm, more specifically 125 μm, more specifically 100 μm, and even more specifically 75 μm. Average film thickness can also vary widely, from a minimum thickness of 10 μm, more specifically 25 μm, more specifically 50 μm, and more specifically 75 μm, and even more specifically 100 μm, to a maximum thickness of 500 μm, more specifically 400 μm, more specifically 300 μm, more specifically 250 μm, more specifically 225 μm, more specifically 200 μm, more specifically 175 μm, more specifically 160 μm, more specifically 150 μm, more specifically 140 μm, more specifically 130 μm, and even more specifically 120 μm. As used herein, average film thickness means a film thickness that would be achieved for a given mass of applied coating at a uniform thickness. Some of the above thicker coatings may require multiple coating passes to achieve the target thickness. Any of the above minimum and maximum sizes for particles or layer thickness can be independently combined to disclose a number of different ranges, subject to the minimum number being smaller than the maximum number. Particle size and average film thickness can be varied to control the depth and frequency of surface projections and recesses, with larger particle size and thicker coatings favoring a greater variation in layer thickness, and smaller particle size and layer thickness favoring a smaller variation in layer thickness. Surface projections and recesses can also be formed on non-powder coatings by the use of additives, polymer curing mechanisms (e.g., polymer macromolecule displacement effects during cross-linking), shrinkage occurring during solvent evaporation, or by physical processes during application of the coating or before cure is complete (e.g., stippling), or by post-cure processes (e.g., calendering).

Figure 3:
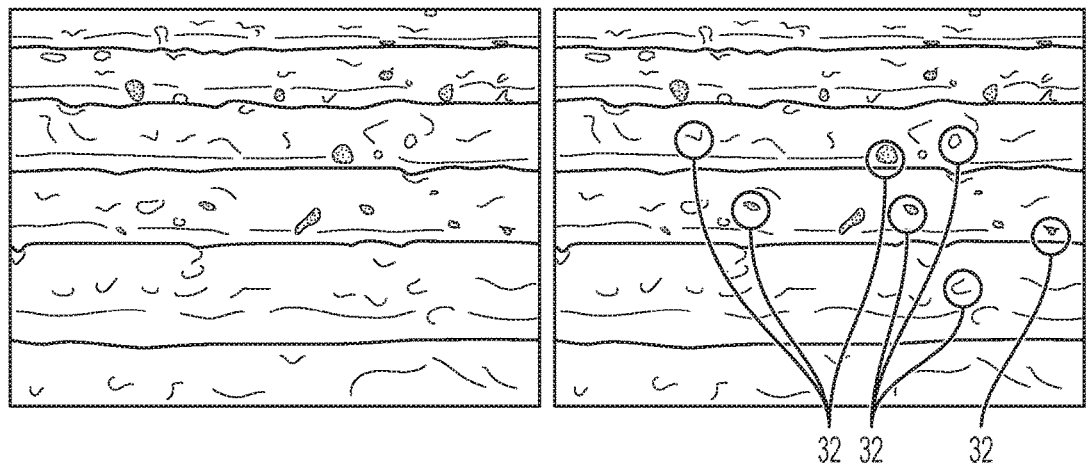
FIG. 3 is an enlarged photograph of a coating surface on an inner shaft of a steering shaft assembly.
Figure 4:
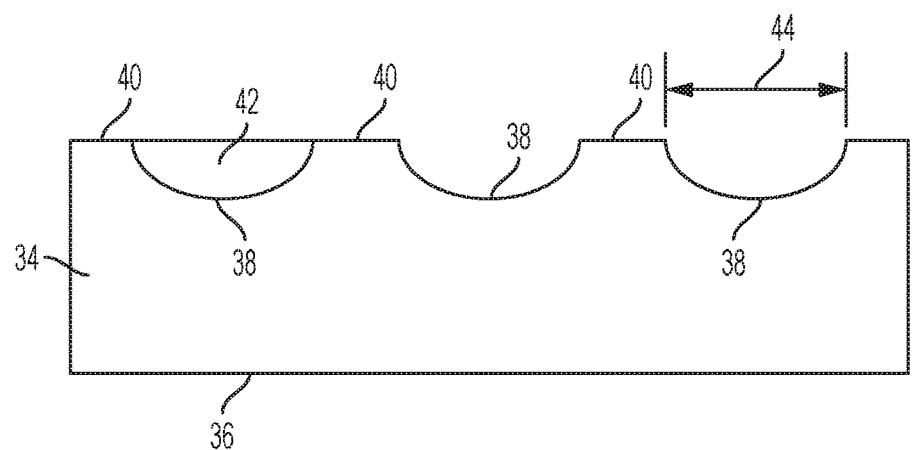
FIG. 4 is a schematic depiction of a cross-sectional view of a portion of a coating on an inner shaft of a steering shaft assembly.

As mentioned above, the coating has a surface pattern of projections and recesses, as shown in FIGS. 3 and 4. FIG. 3 contains duplicates of a magnified photograph of a surface coating with recesses and protrusions. Selected recesses are identified as 32 for illustration in the photograph on the right, whereas the photograph on the left is unmarked. The un-numbered horizontal lines shown in FIG. 3 are male splines from the underlying inner shaft surface 26 (FIG. 2). A number of the recesses shown in FIG. 3 appear dark in color because of grease or other lubricant 42 (FIG. 4) disposed in the recesses. An example embodiment of a coating having a pattern of projections and recesses is schematically depicted in a cross-section view in FIG. 4. As shown in FIG. 4, a polymer coating 34 is disposed on a substrate 36. The surface of the coating has a pattern of recesses 38 and projections 40. In some embodiments, the pattern of surface projections and recesses can provide technical effects for the steering shaft assembly. For example, in some embodiments, the recesses 38 can have a lubricant (e.g., grease) 42 disposed therein, which provides a series of lubricant reservoirs to provide lubricity for slideable engagement between the inner shaft 12 and the outer shaft 16. Such lubricant reservoirs have reduced susceptibility to ejection (and exhaustion) of lubricant from the space between the inner shaft 12 and the outer shaft 16 compared to if the surface were smooth.

In some embodiments, the pattern of recesses and projections can also provide for a press fit tolerance between the inner shaft 12 and the outer shaft 16, with the recesses 38 providing space to accommodate deformation of the coating surface resulting from radially-inward compression and deformation of the coating outer surface projections 40. This can allow for the coating to be applied such the radially-outermost portions of the projections 40 would provide a slightly tighter than optimal fit against the inner surface 28 (FIG. 2) of the outer shaft 16. Such a tight fit would remain undesirably tight if the coating were smooth because the coating would be essentially non-compressible. The recesses 38, however, can provide space to receive coating material from deformation in response to radially-inward compression of the projections 40 when the inner shaft is inserted into the outer shaft, yielding a desired level of press-fit tolerance.

In some embodiments, the projections and recesses at the coating surface can be characterized by a thickness of the coating that varies in a range with a minimum thickness of 0 mm, more specifically, 0.05 mm, more specifically 0.1 mm, more specifically 0.2 mm, more specifically 0.25 mm, more specifically 0.3 mm, more specifically 0.4 mm, more specifically 0.4 mm, more specifically 0.6 mm, more specifically 0.7 mm, more specifically 0.8 mm, more specifically 0.9 mm, and a maximum of 1 mm, specifically, 0.9 mm, more specifically 0.8 mm, more specifically 0.7 mm, more specifically 0.6 mm, more specifically 0.5 mm, more specifically 0.4 mm, more specifically 0.3 mm, more specifically 0.25 mm, more specifically 0.2 mm, more specifically 0.1 mm. In some embodiments, the projections and recesses can be characterized by a size dimension 44 of the recesses parallel to the substrate in a range with a minimum dimension of 1 µm, more specifically 10 µm, more specifically 50 µm, more specifically 100 µm, more specifically 200 µm, more specifically 1 mm, more specifically 2 mm, more specifically 3 mm, and a maximum dimension of 5 mm, more specifically 4 mm, more specifically 3 mm, more specifically 2 mm, more specifically 1 mm, more specifically 500 µm, more specifically 400 µm, more specifically 300 µm, more specifically 200 µm. Any of the above thickness or size dimension values can be independently combined to disclose a number of different ranges, subject to the minimum number being smaller than the maximum number.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A steering shaft assembly, comprising
   an outer shaft operatively connected to a one of a steered member or a steering control, the outer shaft comprising an open end and a receiving chamber associated with the open end;
   an inner shaft operatively connected to another of the steered member or the steering control, the inner shaft comprising an engaging portion axially slideably received in the outer shaft receiving chamber, said engaging portion comprising a polymer coating disposed on an outer surface of the inner shaft engaging portion, the coating comprising an outer surface that slideably engages with a surface of the outer shaft receiving chamber and comprises projections and recesses along said coating outer surface, wherein the coating outer surface is engaged in a press fit tolerance with the receiving chamber surface, with said coating outer surface projections under radially inward compression that is accommodated by spaces between the coating outer surface recesses and the receiving chamber surface.

2. The assembly of claim 1, wherein the inner shaft engaging portion outer surface comprises a plurality of spline teeth extending axially along the inner shaft.

3. The assembly of claim 1, wherein the coating is derived from a powder coating.

4. The assembly of claim 1, further comprising a lubricant disposed in spaces between the coating outer surface recesses and the receiving chamber surface.

5. The assembly of claim 1, further comprising a jacket assembly in which the inner shaft and outer shaft are disposed, the jacket assembly comprising an inner jacket axially slideably disposed in an outer jacket, and a clamping mechanism that alternatively allows or prevents axial movement of the inner and outer jackets with respect to each other.

6. The assembly of claim 1, wherein the inner shaft is operatively connected to the steering member, and the outer shaft is operatively connected to the steering control.

7. The assembly of claim 1, wherein the projections and recesses are characterized by a thickness of said coating that varies in a range from a minimum thickness of 0 mm to a maximum thickness of 1 mm.

8. The assembly of claim 7, wherein the maximum thickness is 0.7 mm.

9. The assembly of claim 7, wherein the maximum thickness is 0.5 mm.

10. The assembly of claim 7, wherein the maximum thickness is 0.4 mm.

11. The assembly of claim 7, wherein the maximum thickness is 0.25 mm.

12. The assembly of claim 7, wherein the minimum thickness is 0.1 mm.

13. The assembly of claim 7, wherein the minimum thickness is 0.2 mm.

14. The assembly of claim 7, wherein the minimum thickness is 0.3 mm.

15. The assembly of claim 7, wherein the minimum thickness is 0.4 mm.

16. The assembly of claim 7, wherein the projections and recesses are further characterized by a size dimension parallel to the inner shaft engaging portion outer surface of the recesses in a range that varies from a minimum dimension 1 µm to a maximum dimension of 5 mm.

17. The assembly of claim 1, wherein the projections and recesses are characterized by a size dimension parallel to the inner shaft engaging portion outer surface of the recesses in a range that varies from a minimum dimension 1 µm to a maximum dimension of 5 mm.

18. A method of assembling the steering shaft assembly of claim 1, comprising
    disposing a lubricant along the engaging portion of the coating outer surface or along a surface of the receiving chamber or along the engaging portion of the coating outer surface and a surface of the receiving chamber;
    inserting the engaging portion of the inner shaft into the receiving chamber of the outer shaft and engaging the projections of the coating outer surface with the receiving chamber surface to dispose the lubricant into the recesses of the coating outer surface.

19. A method of assembling a steering shaft assembly comprising an outer shaft operatively connected to a one of a steered member or a steering control, the outer shaft comprising an open end and a receiving chamber associated with the open end, and an inner shaft operatively connected to another of the steered member or the steering control, the inner shaft comprising an engaging portion axially slideably received in the outer shaft receiving chamber, the method comprising
    inserting the engaging portion of the inner shaft into the receiving chamber of the outer shaft, said engaging portion comprising a polymer coating disposed on an outer surface of the inner shaft engaging portion, said coating comprising an outer surface comprising projections and recesses along the coating outer surface; and
    providing a press fit tolerance between the coating outer surface and the receiving chamber surface by radially-inward compression deformation of the coating outer surface projections, wherein the radially-inward compression deformation of the coating outer surface projections is accommodated by spaces between the coating outer surface recesses and the receiving chamber surface.

* * * * *